July 8, 1930.  L. W. CHRISTOPHEL  1,770,066
LOCK FOR TRUNKS
Filed June 18, 1927
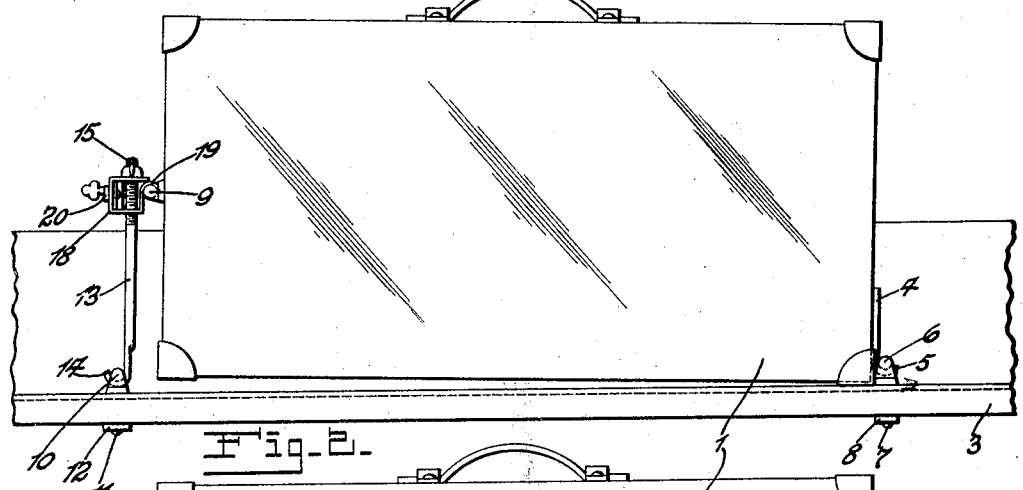
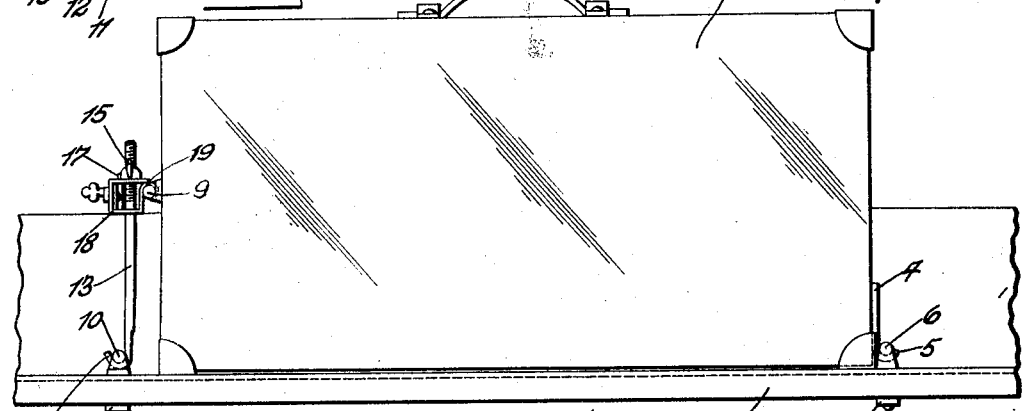
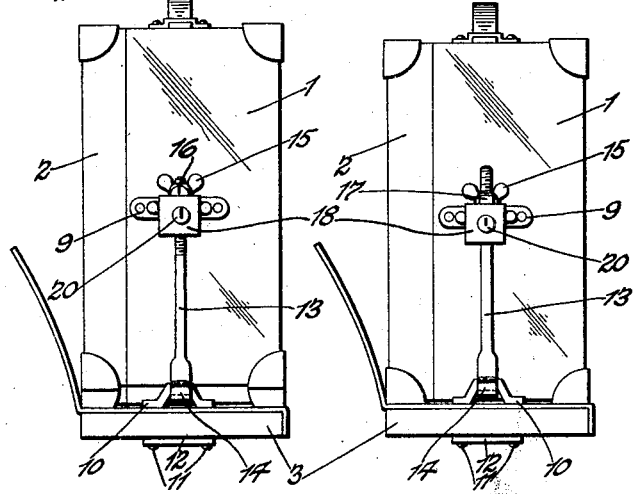
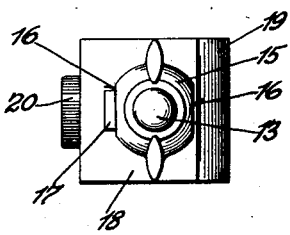
Inventor
Lewis W. Christophel,
by Hippey & Kingsland
His Attorneys.

Patented July 8, 1930

1,770,066

UNITED STATES PATENT OFFICE

LEWIS W. CHRISTOPHEL, OF CLAYTON, MISSOURI, ASSIGNOR TO ATLAS TACK CORPORATION, OF FAIRHAVEN, MASSACHUSETTS, A CORPORATION OF NEW YORK

LOCK FOR TRUNKS

Application filed June 18, 1927. Serial No. 199,666.

This invention relates to locks for trunks and the like, whereby a trunk or the like may be securely attached to a support, as, for instance, the running board or other part of an automobile.

An object of the invention is to provide a device of improved and simplified construction designed and adapted for use to attach a trunk or a similar article in rigid connection with the running board of an automobile or other support and equipped with a lock whereby danger of loss of the trunk or tampering therewith by unauthorized persons is avoided.

It is a familiar fact that persons traveling by automobile are often required to mount trunks and other luggage upon the running board or other exposed part of the automobile, and existing problems have been to obtain satisfactory means for attachment to prevent loss of or tampering with the trunk, to prevent rattling or chattering of the trunk upon the support as a result of the vibration of the automobile when travelling, to support the trunk in such a way that it cannot be opened by an unauthorized person while it is attached to the automobile, and to enable the owner easily and expeditiously to remove the trunk from the support to which it is attached.

Another object of the invention is to provide means whereby these needs and requirements are met and which may be economically manufactured and easily assembled in order to obtain all of the advantages herein disclosed, reference being made to the drawing, in which Fig. 1 is a side elevation of a trunk mounted on the running board of an automobile and having the present invention in connection therewith ready for use.

Fig. 2 is a similar view showing the device in use.

Figs. 3 and 4 are end elevations showing the parts in the positions of Figs. 1 and 2, respectively.

Fig. 5 is an enlarged upper end elevation of the present invention.

In the use and embodiment of the invention shown the trunk 1 is provided with a hinged side 2 and is mounted upon a support 3 which, in this instance, is the running board of an automobile. Preferably the trunk is mounted on the running board with the hinge side 2 toward the vehicle, so that the trunk cannot be opened even by straining the structure without releasing the locking device.

To one end of the trunk body adjacent to the lower edge thereof a plate 4 is attached and is incapable of being removed without breaking or destroying the connections. The lower end of the plate 4 is curved outwardly and upwardly to provide a hook 5 designed and adapted to engage with a clip 6 attached to the running board or support 3 by fasteners 7 passing through the ends of the clip and through a transverse strengthening metallic plate 8 below the support. The construction and relationship of the hooked plate 4 with respect to the clip 6 is such that a close and tight binding engagement is obtained when the hook is passed through the clip; so that when the lower side of the trunk rests upon the support, relative vibration of the trunk is prevented and the trunk will not rattle or chatter during travel of the automobile. To the opposite end of the trunk a pipe 9 is attached and is incapable of removal without breaking or destroying the connections. A clip 10 is attached to the running board or support 3 by fasteners 11 passing through the clip, the running board, and a plate 12 on the underside of the running board similar to the manner in which the clip 6 is attached.

A bolt 13 is formed with a hook 14 on one end which is designed and adapted to engage under the clip 10. The opposite end of the bolt 13 is threaded and has a wing nut 15 screwed thereon and provided with a pair of flat sides 16 for engagement by the bolt 17 of the lock.

The frame 18 may be made of a single piece of metal bent approximately to rectangular shape as shown (Figs. 1 and 2) and having one end bent laterally to provide a hook 19 for engagement over the clip 9. A lock 20 is secured within this frame and includes the lock bolt 17 as a part thereof, said bolt being arranged to be extended and withdrawn through an appropriately shaped hole in the upper end of the frame for engagement with one of the flat sides 16 of the nut 15 to prevent the nut from being turned or to be disengaged from the nut to permit the nut to be turned. The lock is of known construction and the details thereof are not shown, as any appropriate type of lock having an extendible and withdrawable bolt 17 may be satisfactorily used.

The bolt 13 extends entirely through this frame 18 between the lock 20 and the wall of the frame having the hook 19 thereon. The bolt is readily slidable through the frame.

To secure a trunk upon the running board of an automobile or other support the hooked plate 4 is engaged under the clip 6 so as to obtain a close fitting engagement. Preferably these parts fit tightly so that the opposite end of the trunk may require pressure to seat the trunk throughout its length upon the running board or support. The hook 14 of the bolt 13 is then engaged under the clip 10 and the hook 19 of the frame 18 is engaged over the hook 9. During this assembly of the parts the lock bolt 17 is withdrawn downwardly into the lock, leaving the nut 15 free for operation. Then the nut 15 is screwed onto the bolt with the result that the frame 18 is forced down along the bolt, drawing the end of the trunk onto the running board or other support. When the parts are placed in a tight fit with one of the flat sides 16 toward the bolt 17, the lock is operated to extend the bolt against the adjacent flat side 16 of the nut and the key is withdrawn from the lock, leaving the parts in satisfactory adjustment.

The construction and arrangement may be varied within equivalent limits without departure from the nature and principle of the invention, in which I do not restrict myself to unessential details, but what I claim is:—

1. A device of the character described comprising a bolt having one end threaded, means in connection with the opposite end of the bolt for holding the bolt in connection with a retaining element, a frame mounted for sliding movements along the bolt, means in connection with the frame for engaging an element to be held, a nut screwed on the bolt for holding said frame from outward movement along the bolt, an element supported within said frame between said bolt and the outer side of the frame and at the side of said bolt opposite from said last-named means, and an actuator for moving said element to extend beyond the side of the frame toward the plane of the end of the bolt to position to engage said nut to hold said nut from turning and for withdrawing said element from beyond the side of the frame to permit said nut to turn.

2. A device of the character described comprising a bolt having one end threaded, means for holding the opposite end of the bolt in connection with a retaining element, a frame mounted for sliding movements along the bolt and having one side extending upwardly at a distance from the bolt, a part in connection with the opposite side of said frame for engaging an element to be held, a nut screwed on the bolt for holding said frame from outward movement along the bolt, an element supported within said frame between said first-named side of said frame and the bolt and movable to extended position through and beyond the side of the frame toward the plane of the outer end of said bolt to position to hold said nut from turning and movable in the opposite direction to position to permit said nut to turn, and an actuator supported by said first-named side of said frame for moving said element as aforesaid.

3. A device of the character described comprising a bolt having a threaded end, a frame mounted for sliding movements along the bolt and having one side extending upwardly at a distance from the bolt, means in connection with another side of said frame for engaging an element to be held, a nut screwed on the bolt for holding said frame from outward movement along the bolt, an element supported between said first-named side of said frame and said bolt for movement through the side of said frame that is toward said nut to position to be engaged by and to hold said nut from turning, and being movable in the opposite direction to position to permit said nut to be turned, and an actuator supported by said first-named side of said frame for moving said element.

4. A device of the character described comprising a bolt, means for holding the bolt in engagement with a retaining element, a frame having spaced parts and mounted for sliding movements on and along the bolt while the bolt remains stationary, a part in connection with the frame for engaging an element to be held thereby, a nut screwed on the bolt for engaging one side of one of said spaced parts of said frame and holding the frame in rigid position on the bolt, and a device supported by said frame at the opposite side of said spaced part from said nut for movement through said part, to engage and hold the nut from turning.

LEWIS W. CHRISTOPHEL.